United States Patent [19]

Kerigan et al.

[11] 4,334,286
[45] Jun. 8, 1982

[54] DATA ENTRY APPARATUS FOR ENTERING TABULAR DATA ROW BY ROW AND COLUMN BY COLUMN

[75] Inventors: Shaun C. Kerigan; Brian D. Key, both of Winchester; James Smith, Southampton, all of England

[73] Assignee: International Business Machines Corporation, Armonk, N.Y.

[21] Appl. No.: 26,618

[22] Filed: Apr. 2, 1979

[30] Foreign Application Priority Data

Aug. 14, 1978 [GB] United Kingdom ............... 33220/78

[51] Int. Cl.³ .......................... G06F 3/023; G06F 3/12
[52] U.S. Cl. .................................................. 364/900
[58] Field of Search ... 364/900 MS File, 200 MS File; 400/63

[56] References Cited

U.S. PATENT DOCUMENTS

| | | | |
|---|---|---|---|
| 3,360,783 | 12/1967 | Goldsberry et al. | 364/900 |
| 3,577,127 | 5/1971 | Bishop et al. | 364/900 |
| 3,579,193 | 5/1971 | Bernier | 364/900 |
| 3,618,032 | 11/1971 | Goldsberry et al. | 364/900 |
| 3,618,823 | 6/1974 | Manber . | |
| 3,648,245 | 3/1972 | Dodds, Jr. et al. | 364/200 |
| 3,829,855 | 8/1974 | Kolpek et al. | 364/900 |
| 3,837,459 | 9/1974 | Martin | 364/900 X |
| 3,952,852 | 4/1976 | Greek, Jr. et al. | 364/900 X |
| 3,999,164 | 12/1976 | Kashio | 364/900 |
| 4,045,780 | 8/1977 | Kashio | 364/900 |

FOREIGN PATENT DOCUMENTS 1330548  9/1973  United Kingdom .
1434777  5/1976  United Kingdom .

OTHER PUBLICATIONS

3277 Display Station Models 1 and 2, Troubleshooting Guide, IBM, Form SY 27-2314-4, Oct. 1974 (part of file folder).

*Primary Examiner*—Harvey E. Springborn
*Attorney, Agent, or Firm*—James H. Barksdale, Jr.

[57] ABSTRACT

A keyboard/display apparatus enters tabular data in two different modes. For the entry of tabular data in a row by row mode, a tab key on the keyboard is depressed for causing tabbing to a next set tab on the same line. For the entry of tabular data in a column by column mode, a coded tab is keyed for causing left tabbing to a nearest set tab on a following line.

1 Claim, 6 Drawing Figures

DATA ENTRY APPARATUS FOR ENTERING TABULAR DATA ROW BY ROW AND COLUMN BY COLUMN

BACKGROUND OF THE INVENTION

1. Field of the Invention

This invention relates to a data entry apparatus and has particular application to text processing apparatus incorporating a keyboard and a video display on which text is displayed as it is entered from the keyboard.

2. Description of the Prior Art

In data entry, generally, and in text entry, in particular, data can be entered into the data or text processing system by means of a keyboard. As will be appreciated, most data entry equipment is designed to facilitate data entry row by row. It is sometimes necessary, however, for data to be entered column by column. As an example, a document being created on a word processing machine might require lists or tables to be entered within the text. Frequently it would be easier if these lists or tables were entered column by column rather than row by row. Such would be the case where an audio-typist is typing dictated text and where a table had been dictated column by column.

One of the basic aids used in data entry is the tab function. In a typewriter, for example, tab stops can be set up before text is typed. By pressing a tab key, the typewriter can be caused to index to the next tab position. Representative of recent magnetic media typewriters capable of handling a number of tabbing functions is the IBM Mag Card II Typewriter. In the IBM Mag Card II Typewriter, a required tab can be used to indent text. Thus at the beginning of a paragraph which is to be indented, a required tab is set by simultaneously depressing a CODE key and a tab key. After the first line of the paragraph has been typed, depression of the carrier return key will cause the type head to return to the left hand margin and then be automatically positioned at the set required tab position on the next line. At the end of the paragraph, the required tab instruction is cancelled by entering a required carrier return. A required carrier return is entered by simultaneously depressing the CODE key and the carrier return key. If the IBM Mag Card II Typewriter being utilized is provided with a "Reverse Index" optional feature, the platen can be indexed half a line in either an upward or downward direction. The reverse index function is designed to make the typing of superscripts and/or subscripts faster and easier. However, if would be possible to use a combination of the indented text function and the reverse index function to enter data column by column rather than row by row. However, during subsequent printout the data would be printed column by column rather than row by row. This is not the most efficient manner of using a printer since the time taken to reverse-index the platen between columns is wasted (no printing occurs).

According to this invention, there is provided data entry apparatus for entering tables and controlling tabbing row by row and column by column during the entry of tables. The apparatus includes a keyboard, a tab rack, and a display having a cursor defining a data entry point. Included on the keyboard are a key to set tab stops in the tab rack, a code key, and a tab key for causing cursor movement to a following tab stop. For columnar work, an operator of the apparatus has two choices of entering tables through the keyboard. That is, following entry of one line of one table, the operator can depress the tab key and cause the cursor to be moved to the right along the same line to the next tab stop for the entry of a line of another table. If the same table is to be worked on, the operator can depress both the code key and the tab key. This will cause the cursor to be moved directly to the nearest tab stop to the left on the next line.

Therefore, an object of the present invention is to provide a data entry apparatus in which data can be entered conveniently column by column as well as row by row.

Another object of the present invention is to provide an improved data entry apparatus in which data can be entered as conveniently column by column as row by row and in which the entered data will be subsequently printed out row by row whichever way the data has been entered.

BRIEF DESCRIPTION OF THE DRAWING

In order that the invention may be readily carried into effect, it will now be particularly described, by way of example, with reference to the accompanying drawing, in which.

DESCRIPTION OF THE PREFERRED EMBODIMENT

Figure 1:
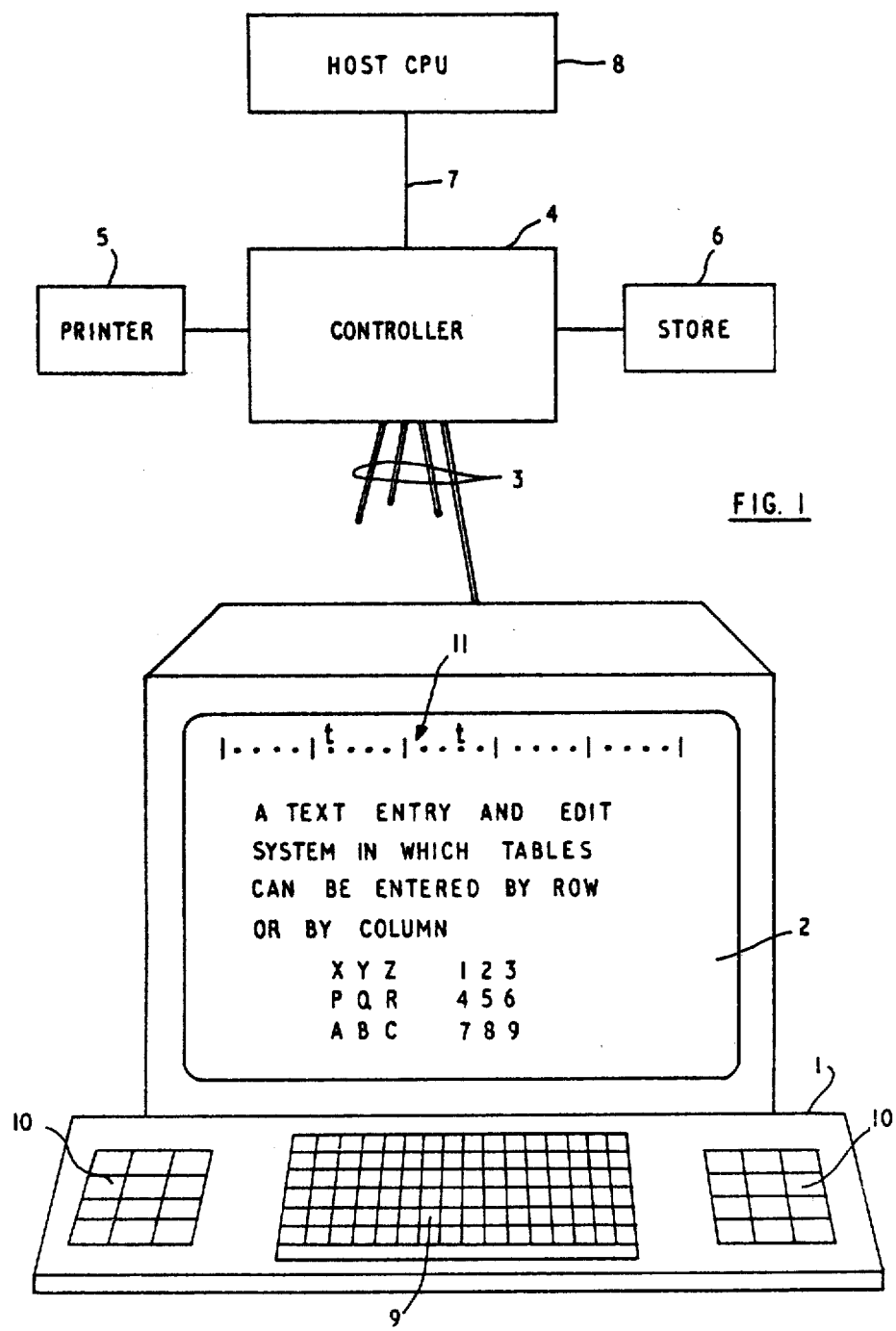
FIG. 1 is a block diagram of a text processing apparatus connected to a host processor.

Referring now to FIG. 1, a text processing apparatus comprises a keyboard 1 by means of which text and text commands can be entered, and a video display 2 on which text can be displayed whilst it is being entered or edited. The keyboard 1 and video display 2 are connected through a cable 3 to a controller 4. Other displays and their associated keyboards, not shown, can be connected to the controller 4. Attached to the controller 4 is a printer 5. Printer 5 can be a daisy-wheel printer for quality printing or a line printer for proof-quality printing. Printer 5 provides a means by which text entered into the apparatus can be printed. Also attached to the controller 4 is a store 6. Store 6 can be a magnetic disc store. Entered text is stored in store 6 for later recall. Standard paragraphs which can be merged into individual letters or documents may also be stored in the store 6. Optionally, the controller 4 can be attached via a data link 7 to a host processor 8. Processor 8 can be constituted by an IBM System/370 computer. Such a host connected system could be used for electronic mail purposes where a document created on one text processing apparatus could be transmitted electronically to a remote printer.

Attention is directed towards British Patent Specification No. 1533499 (corresponding to U.S. Pat. application Ser. No. 922,416) which describes a text processing apparatus having certain parts in common with the present apparatus and which is described with respect to certain text functions which can be performed on a word by word basis as well as on a character by character basis.

Typically, the video display 2 and associated keyboard 1 can be constituted by an IBM 3277 Model 2 video display unit modified as described below and optionally containing the modifications described in the aforementioned patent specification. The controller 4 can be constituted by an IBM 3791 controller. Since details of the controller 4, printer 5, store 6 and host processor 8 are not necessary to an understanding of the present invention, they will not be further described in detail although reference will be made to their function.

Returning to FIG. 1, the keyboard 1 has a number of keys or keybuttons 9 and 10. Keybuttons 9 are typically arranged as in a normal typewriter, by means of which alphanumeric characters and other symbols can be keyed in by the operator. Keybuttons 10 are used for entering text commands and for controlling the apparatus. Thus, keys 10 are used to set up margins, to set up tab stops and to move a cursor on the display, and include inter alia a tab key and an alternate CODE key which is effectively a key shift.

To assist the operator, various formatting symbols, not shown, are displayed on the display 2. A scale 11 is displayed at the top of the display 2 to show the various character positions across the display 2 and on which two tab stop positions (represented by t) are shown. Shown on the display 2 is a table consisting of two columns. As indicated above, an object of the invention is to allow such a table to be entered as conveniently column by column as it can be row by row.

Figure 2:
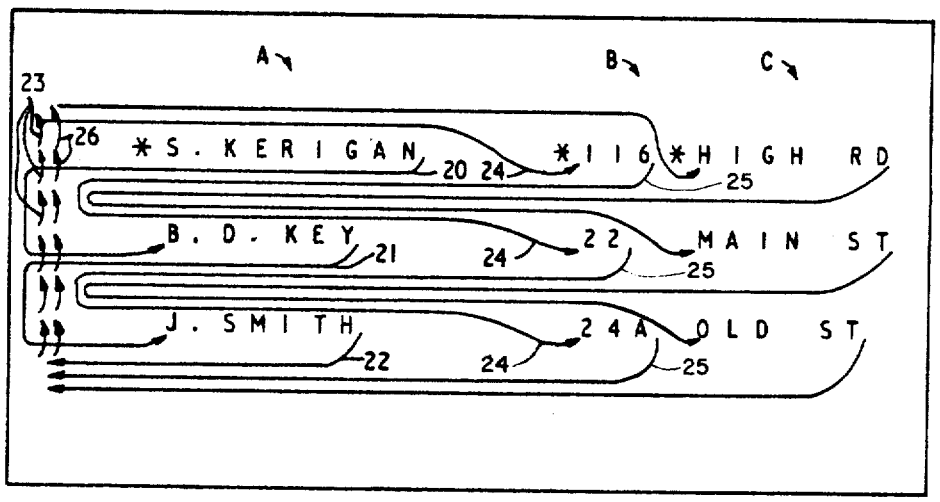
FIG. 2 shows how text can be entered column by column using the IBM Mag Card II Typewriter.

It will be convenient here to refer to FIG. 2 which illustrates how a table consisting of three columns of three rows can be built up on an IBM Mag Card II Typewriter using the aforementioned indent and reverse index functions. This table, which is repeated in later Figures, is only intended to give an idea as to how tables are created. In practice the table is likely to be much larger and more complicated. To enter column A, the operator first would enter a coded tab stop at the place indicated by the asterisk. After entering the name "S. Kerigan", the operator would enter a carrier return. This will cause the carrier to return to the left hand margin and then to advance to the coded tab stop as represented by the arrow 20. The next name "B. D. Key" is entered and the carrier return key operated to return the carrier to the left hand margin and then to the coded tab stop as represented by arrow 21. When the last entry in column A has been entered, the operator keys a required carrier return (CODE key plus carrier return key) and the carrier will be returned to the left hand margin as represented by arrow 22. The platen is next reversed using the reverse index key the appropriate number of times. Since the reverse index movement is ½ line, some six key strokes (as indicated by arrows 23) will be required to index the platen back to the first row of the table.

The carrier is next advanced to the first position of column B where a coded (required) tab will be entered as indicated by the asterisk. The column of numbers can then be entered using the carrier return key on all lines except the last. This causes the carrier to return to the left hand margin and then to advance to the coded tab stop position as indicated by arrows 24. At the end of column B, required carrier return is used to return the carrier to the left hand margin as indicated by arrow 25 and to cancel the coded tab stop. The platen can then be reverse indexed, as indicated by arrows 26, to the first row of the table and the carriage advanced to the first position in column C. Text can then be entered as in columns A and B. Although this operation is possible, it is not very convenient both from a data-entry point of view and from the point of view of subsequent printing. Thus, to key in the table of three columns of three rows on a column by column basis, some 33 keystrokes were required in addition to the actual data entered. This contrasts with some 12 keystrokes which would have been required if the table had been entered row by row using ordinary tabs. Of course, during printing, the table would be printed in nine passes (rather than three) and the platen would be reverse indexed twice.

This illustrates how much more convenient it is for the operator, even using an advanced typewriter, to enter a table row by row rather than column by column. When the tables consist of long lists of numbers or are dictated column by column rather than row by row, it may be very inconvenient, if not impossible, to enter the data row by row.

Figure 3:
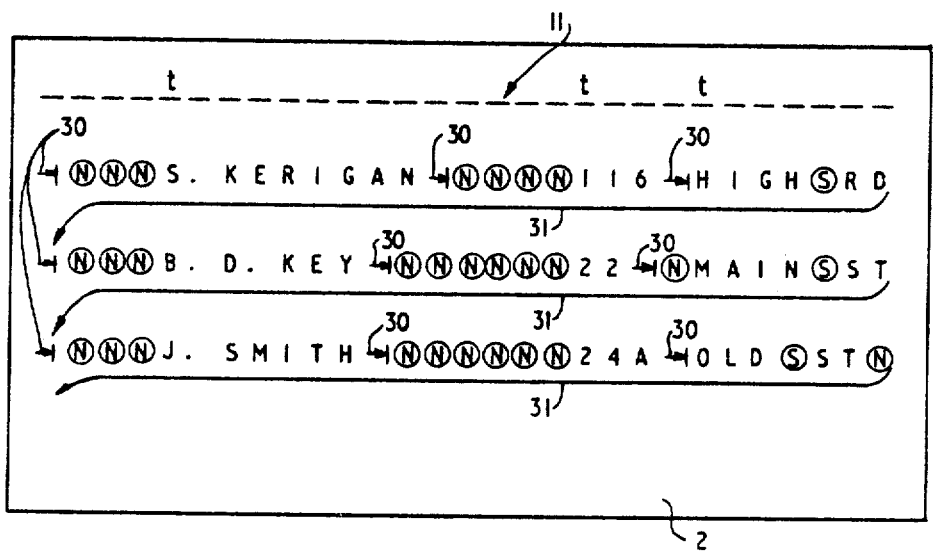
FIG. 3 shows how text is normally entered on the apparatus of FIG. 1.

FIG. 3 illustrates how the table shown in FIG. 2 can be entered on the display 2 of the text processing apparatus shown in FIG. 1. FIG. 3 shows part of the display 2 with part of the scale 11 at the top. On the scale 11 are displayed three tab stops t entered from the keyboard 1 in FIG. 1. As will be explained in more detail below, the characters displayed on the screen are held in a message or refresh buffer together with other character codes representing formatting characters which may or may not be displayed. Shown in FIG. 3 are characters ⓥ and ⓢ which represent nulls and required spaces respectively. These characters are shown circled because they would not normally be visible on the screen although their codes will be in the message buffer. The small arrows 30 displayed on the screen represent tab keystrokes required to enter the table row by row. The large arrows 31, which are not in fact displayed, represent "carrier return" keystrokes. It will be appreciated that although these latter keystrokes are referred to as "carrier return" keystrokes, the table is created on a display so that there is not really a carrier to return. The phrase is used in an analogous sense. To enter the table row by row, and neglecting the keystrokes required to enter the characters themselves, some 12 tab and carrier return keystrokes are required which is comparable to the number required in the IBM Mag Card II Typewriter.

Figure 4:
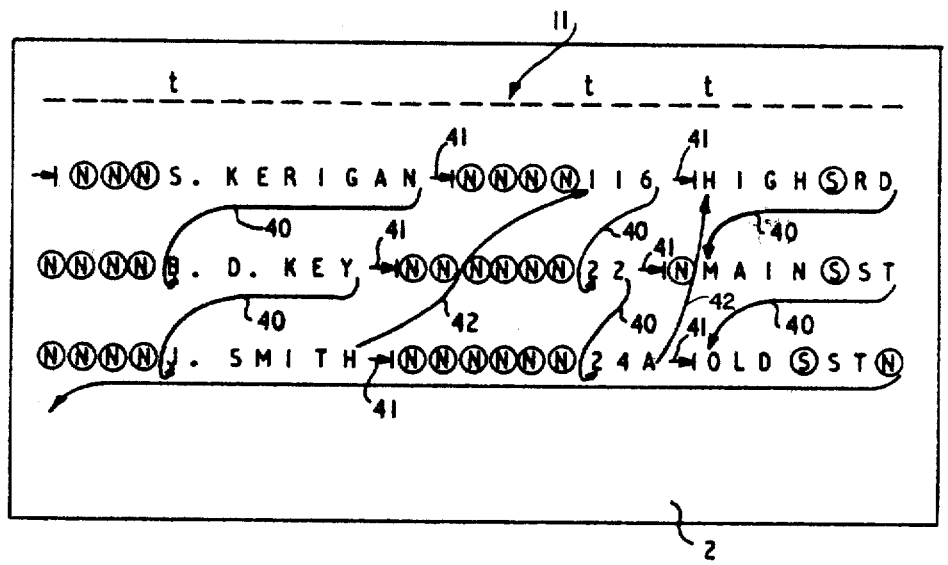
FIG. 4 shows how text can be entered column by column on the apparatus of FIG. 1.

FIG. 4 is a similar view to FIG. 3, but showing how the table has been entered column by column. In this case however, instead of operating the tab key normally as in FIG. 3, the operator at the end of each line within the column, operates a coded tab key, i.e., simultaneously depresses the tab key and the code key. This causes a "carrier return" to the next following line and the nearest tab stop position on that line to the left of the position at which the coded tab key was entered without returning to the left margin. In other words, the cursor on the screen will move from the character position immediately after the last character entered in the column direct to the first character position on the next line of that column. This action is represented by the arrows 40 in FIG. 4. As the coded tab keystroke is made, the normal tab symbol will be displayed on the screen as represented by arrows 41.

To move the cursor on the screen from the last character position in the last row of a column to the first character position in the first row of the next column, use is made of the cursor moving keys on the keyboard 1, FIG. 1. Generally this will involve moving the cursor upwards and then to the right as indicated by arrows 42. As an alternative, the apparatus could be arranged so that by using a particular function key, the cursor could, under program control, be automatically positioned at the beginning of the next column rather than requiring the use of the cursor moving keys. It will be evident by comparison of FIGS. 3 and 4 that the data on the screen (and therefor in the aforementioned message or refresh buffer), whether visible characters or invisible characters, is the same in both instances. Therefore when the data is subsequently printed, it will be printed in the same way.

Figure 5:
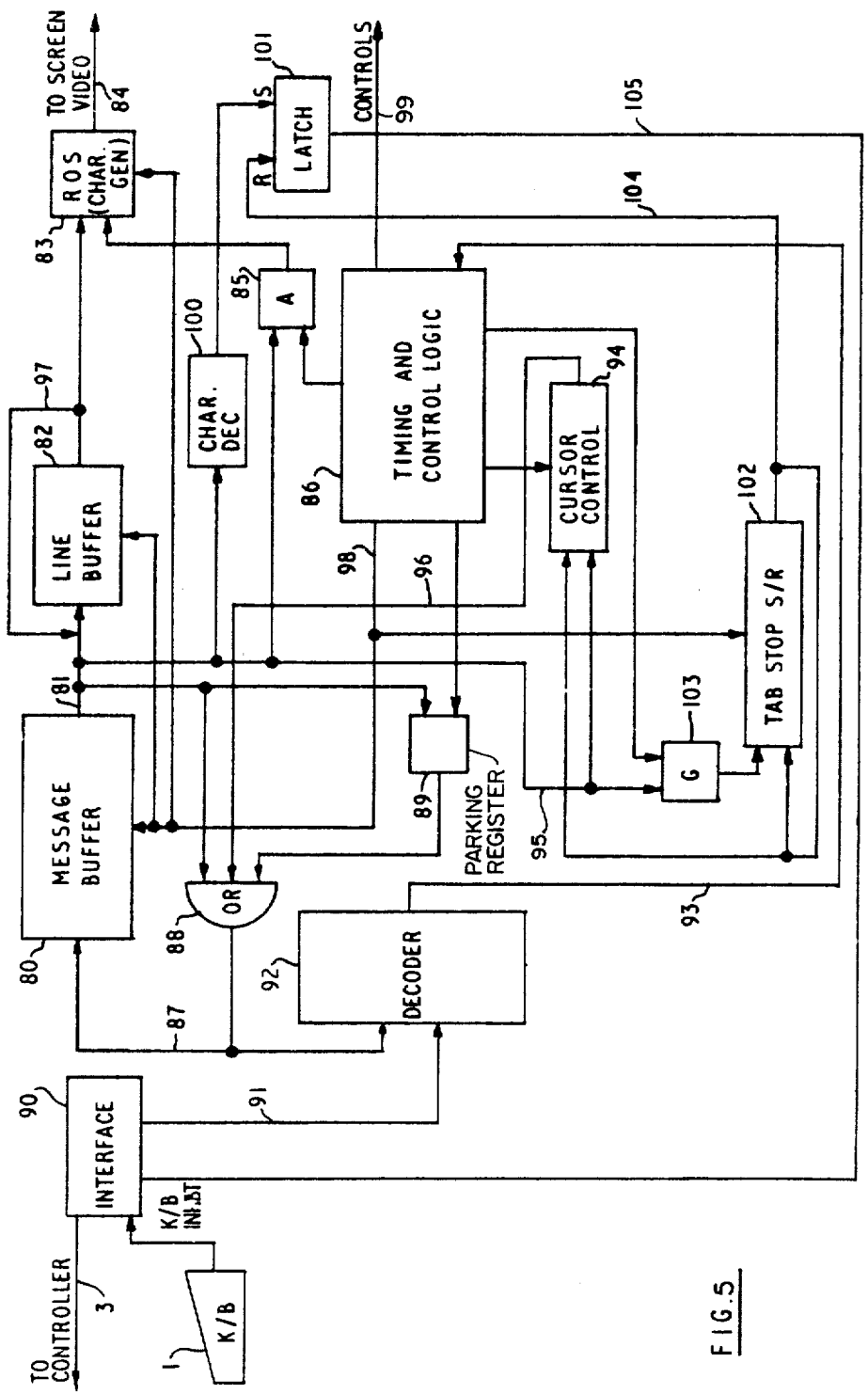
FIG. 5 is a block diagram of one embodiment of the invention.

FIG. 5 illustrates the main parts of the IBM 3277 video display unit with certain modifications to practice the present invention. Up to 1,920 alphanumeric characters can be displayed in the cathode ray tube (CRT) of this display unit in 24 rows. Each row of characters is constituted by nine raster scan lines, characters being displayed on a 7×9 dot matrix. Characters to be displayed are stored within a 1920-byte message buffer 80. This buffer is cyclically scanned and its output used to refresh the CRT display. As each row of characters is read from the buffer 80 on line 81, it is assembled into 80, 7 bit wide bytes in line buffer 82. Thus line buffer 82 will contain successive lines of data to be displayed on the CRT. Before the row of characters in the line buffer 82 can be displayed, the character codes therein are used to access a character generator 83 constituted by a read only store. A read/write store could be used as an alternative. Video information from the character generator 83 is serialized in a serializer, not shown, as it is transmitted to the CRT along line 84. As is normal with the IBM 3277 display unit, during the first scan line of each row of characters, the video information is generated from the character generator by clocking the output signals on line 81 directly from the message buffer 80 through AND gate 85 by means of a clock signals from timing and control logic 86.

The message buffer 80 is a recirculatory memory and the data stream from its output on line 81 is fed back to its input line 87 through an OR gate 88. A parking register 89, controlled by the timing and control logic 86, is used to allow for the insertion of characters into the data stream. Located within the video display unit is interface circuitry 90 to which is connected the keyboard 1 and cable 3 which connects the display unit to the controller 4, FIG. 1. The interface circuitry 90 receives character codes and commands from the keyboard 1. Data received from the controller on cable 3 are deserialized in the interface circuitry 90 before distribution along line 91 to a decoder 92 within the video display unit. Data within the message buffer 80 can also be transmitted through the interface 90 for storage and/or reformatting in the controller. From the decoder 92, character and control codes received from the controller or keyboard can be transmitted to the input of the message buffer 80 and command signals are transmitted on line 93 to the timing and control logic 86.

Cursor control logic 94 is used to control the movement and position of the cursor on the screen and within the message buffer 80. To this end, the cursor control logic 94 receives the output of the message buffer 80 along line 95 so as to detect the position within the data stream of a tag bit which represents the position of the cursor on the screen. The tag bit can be deleted or inserted in the data stream on line 96.

In the IBM 3277 video display unit, the line buffer 82 is a recirculating memory as indicated by the feedback loop 97. It will be appreciated that the invention is not limited to the use of recirculating machines. Data within the message buffer 80, the line buffer 82 and character generator 83 are maintained in synchronism by means of timing signals on line 98 from the timing and control logic 86. The timing and control logic 86 also supplies screen timing and control signals on line 99 to the CRT.

What have been described so far with reference to FIG. 5 are standard components of the IBM 3277 video display unit. It will be appreciated that details of these and other standard components have not been described since they are not essential to an understanding of the present invention. In addition to these standard components, the display unit additionally includes a character decoder 100, a latch 101, a tab stop shift register 102 and a gate 103.

The tap stop shift register 102 is an 80-bit recirculating memory, driven in synchronism with the buffer 80, and in which each tab stop is represented by a bit whose position is representative of the position of the tab stop. To this end, the tap stop characters (t, c or d) in the first row on the display (representing the scale index at the top of the screen) are gated through the gate 103 under control of the timing and control logic 86. As discussed earlier with reference to FIGS. 3 to 4, when the operator presses the tab key on keyboard 1, a tab character (→|) is displayed on the screen and the cursor is subsequently moved either to the next tab stop on the same line (for normal tabbing) or to the tab stop immediately to the left on the next line (for column tabbing). These tab characters will, of course, be stored within the message buffer 80. The character decoder 100 senses the presence of these tab characters and whenever a tab character is detected, the decoder 100 sets the latch 101. The latch 101 is reset, along line 104, whenever a tab stop appears at the output of the tab stop shift register 102. When the latch 101 is in the set condition, its output inhibits the keyboard along line 105. This action prevents the operator from inserting a character between the tab character and the tab stop.

This function is illustrated in Table I below.

TABLE I

| Character position | 0 | 1 | 2 | 3 | 4 | 5 | 6 | 7 | 8 | 9 | 10 | 11 | 12 |
|---|---|---|---|---|---|---|---|---|---|---|---|---|---|
| Tab stop | | | | | | t | | | | | t | | |
| Tab character | | | →| | | | | | →| | | | | |
| Latch 101 set | |—————| | | | |—————| | | | | |

As will be seen, the latch 101 can be set many times on one line.

In the standard IBM 3277 video display unit, the cursor control logic 94 controls the movement and position of the cursor on the screen. Inter alia, logic 94 senses the current position of the cursor, moves the cursor in accordance with the cursor movement keys on the keyboard, advances the cursor by one position for each keyed character, and also contains logic to prevent movement of the cursor into protected fields during insertion of data.

To accommodate normal tabbing, the cursor control logic 94 is also responsive to the operation of the tab key to move the cursor to the next tab stop on the line. To this end, cursor control logic 94 receives the positions of the tab stops from the tab stop shift register 102 and moves the cursor to the next tab stop position when the tab key is depressed. For column tabbing, described above with reference to FIG. 4, the action of the cursor control logic 94 is different. When logic 94 senses that a coded tab key has been depressed, it moves the cursor to the next line and to the nearest tab stop to the left of its current position.

Figure 6:
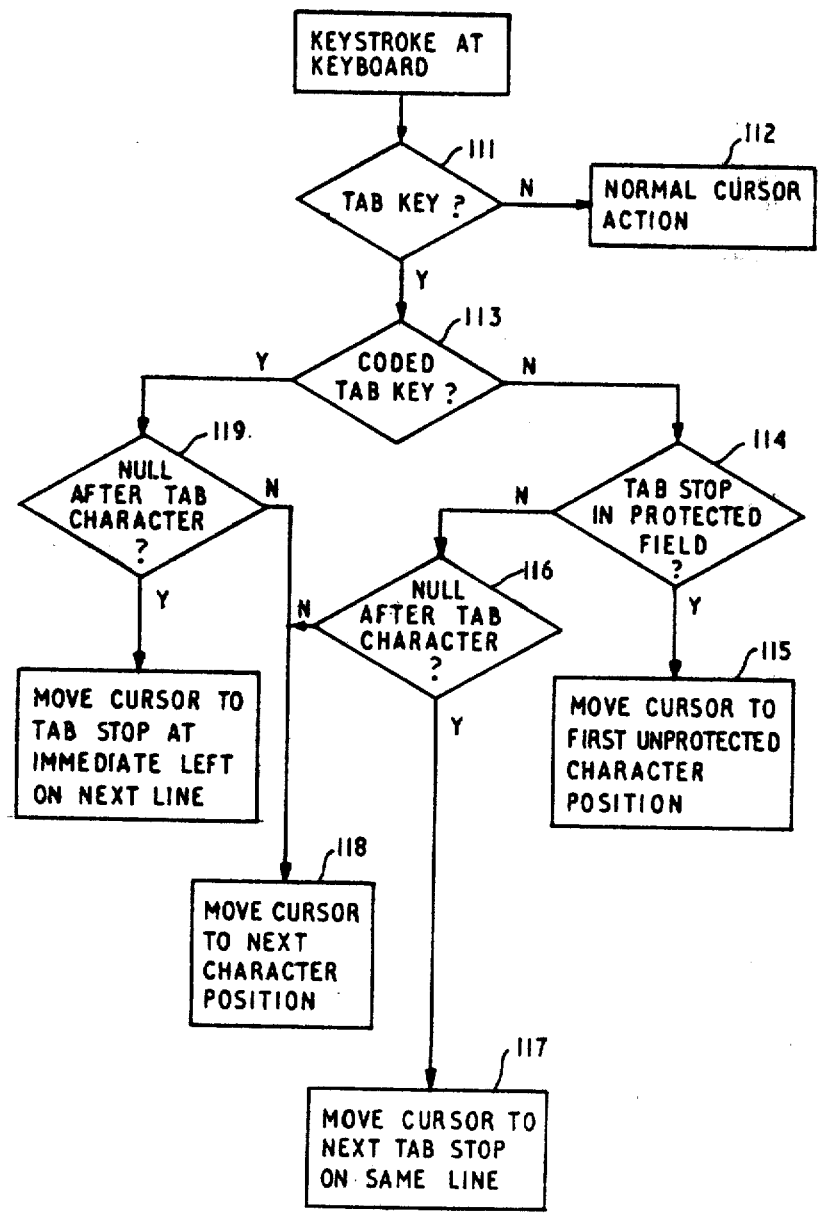
FIG. 6 is a flow chart showing the operation of cursor control logic during normal and column tabbing.

Details of the extra logic within the cursor control logic 94 are not given in this specification. It is believed that suitable logic circuits are well within the design capabilities of any competent logic designer. FIG. 6 is a flow chart showing the extra function required of the cursor control logic 94 and from which either a logic circuit can be designed or microcode written if the video display unit is a microcode controlled machine. Decision 111 determines whether the keystroke is a tab key. If it is not, normal cursor action applies as at 112. If the keystroke is a tab key, decision 113 determines whether it is a normal tab or whether it is a column tab (coded tab). If it is a non-coded tab, i.e., normal tabbing, a decision is made at 114 to determine whether the next tab stop on the same line is in a protected field. If it is, the cursor is moved to the first unprotected character position after that tab stop position as at 115. Within this specification, the term "protected field" has the same meaning as in the standard IBM 3277 display. Characters cannot be entered into protected fields on the screen.

Where the next tab stop is not in a protected field, a determination is made at 116 as to whether there is a null after the tab character. If there is, the cursor is moved to the next tab stop position on the same line as at 117 or, if there is no tab stop before the end of the line, to the end of the line. If there is no null character after the tab character, the cursor is moved to the next character position as at 118. When the data is transmitted to the controller 4, the controller 4 will re-arrange the data by shifting any characters between the tab character and the tab stop to the right of the tap stop.

If the decision at 113 was that a coded tab key had been operated, an optional determination may be made at 119 as to whether there is a null character after the tab character. If there is no null character present, the cursor will be moved to the next character position as at 118. When the data in the message buffer is next transmitted to the controller 4, the controller 4 will reformat the data by shifting any characters between the tab character and the next tab stop on the line to the right of that tab stop. If the optional determination at 119 is that there is a null after the tab character, or if the determination at 119 is not made, the cursor will be moved downward to the next line and direct to the tab stop to the immediate left. In the special case where coded tab is operated when the cursor is in the tab stop position, the cursor will just move to the next line. If the cursor at the new tab stop position is in a protected field, character input from the keyboard will be inhibited. This is slightly different to the normal tabbing operation where the cursor will not be moved into a protected field.

The invention has been described with reference to a modified IBM 3277 video display unit which preferably, though not essentially, incorporates the modifications described in our aforementioned Patent Specification. Those skilled in the art will appreciate that the invention also has application in other data entry apparatus, for example a video display unit incorporating a microprocessor operating under microprogram control. The invention has also been described with reference to languages which read from left to right. Those skilled in the art will recognize that the invention also has application to those languages which read from right to left in which case tabbing would normally be from right to left.

If the display screen is a gas panel or other display device which has inherent memory and does not require refresh, the message buffer can be constituted by the display device itself provided that the displayed characters can be accessed to determine the data content of the display device.

What is claimed is:

1. In a data entry apparatus including (a) a keyboard having alphanumeric character keys, a tab key and a code key, (b) a display including a cursor movable upon depression of said character and tab keys, and (c) a tab rack for storing set tab stops about which tables are to be entered, a keystroke saving method of entering lines of tables both row by row and column by column, said method comprising:

(a) entering a line of a table along one print line by depressing said character keys; and (b) depressing said tab key following entering said line to cause movement of said cursor to the right along said one print line to the next set tab stop if lines of different tables are to be entered row by row;

(c) depressing both said tab key and said code key to cause movement of said cursor down and to the left directly to the nearest set tab stop on a next print line following said one print line if the next line of said table is to be entered following entering of said line.

* * * * *